R. F. CHATILLON.
SCALE.
APPLICATION FILED JAN. 24, 1914.

1,220,192.

Patented Mar. 27, 1917.
2 SHEETS—SHEET 1.

Witnesses:
Joseph A. Connolly Jr.
Geo. N. Kerr

Inventor
Ralph F. Chatillon
By his Attorneys
Edwards, Sager & Wooster

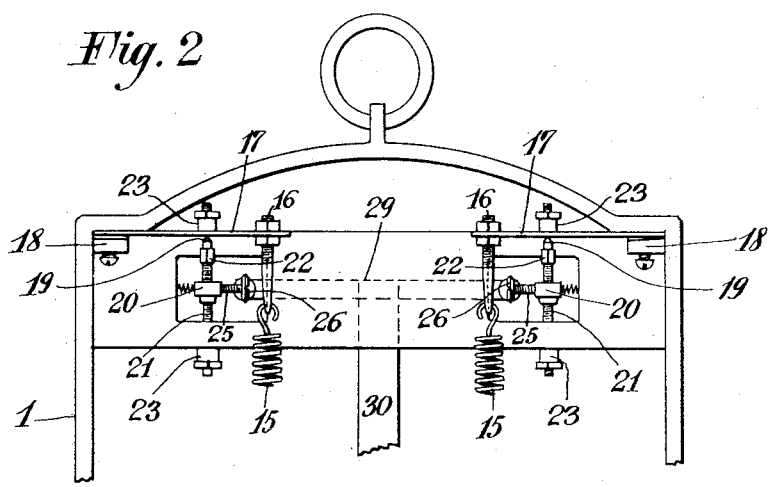
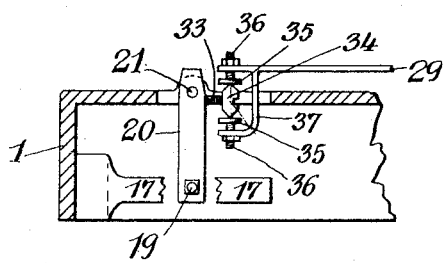

UNITED STATES PATENT OFFICE.

RALPH F. CHATILLON, OF GREENBURG, NEW YORK, ASSIGNOR TO JOHN CHATILLON & SONS, A CORPORATION OF NEW YORK.

SCALE.

1,220,192.  Specification of Letters Patent.  Patented Mar. 27, 1917.

Application filed January 24, 1914. Serial No. 814,080.

*To all whom it may concern:*

Be it known that I, RALPH F. CHATILLON, a citizen of the United States, residing at Greenburg, in the county of Westchester and State of New York, have invented certain new and useful Improvements in Scales, of which the following is a full, clear, and exact specification.

This invention relates to scales, and has particular reference to means for automatically compensating for temperature variations in spring scales.

According to this invention, a spring scale comprising coiled and leaf springs in series is corrected for temperature, by causing a pivot or fulcrum for the leaf spring to be automatically moved by a thermostat relatively to the point of attachment of the coil spring. The particular object of the invention is to provide connections between the thermostat and the movable fulcrum wherein a relatively small temperature variation will produce a sufficient change of the fulcrum so that the leaf spring will vary in resiliency oppositely to the variation produced by the change of temperature on the coil spring.

Further objects of the invention consist in the provisions for calibration and adjustment, together with the arrangement and relative location of the parts whereby compactness in construction is attained.

It is well known that the strength of a spring decreases with increase in temperature, and vice versa, and at present it is desirable that spring scales be corrected for temperature.

The invention will be more fully understood in connection with the following description of the accompanying drawings, wherein—

Fig. 2 is a front view of the top portion, the dial being removed;

Fig. 3 is a top plan view, and

Fig. 4 is a top plan view of a slightly modified construction.

Figure 1:
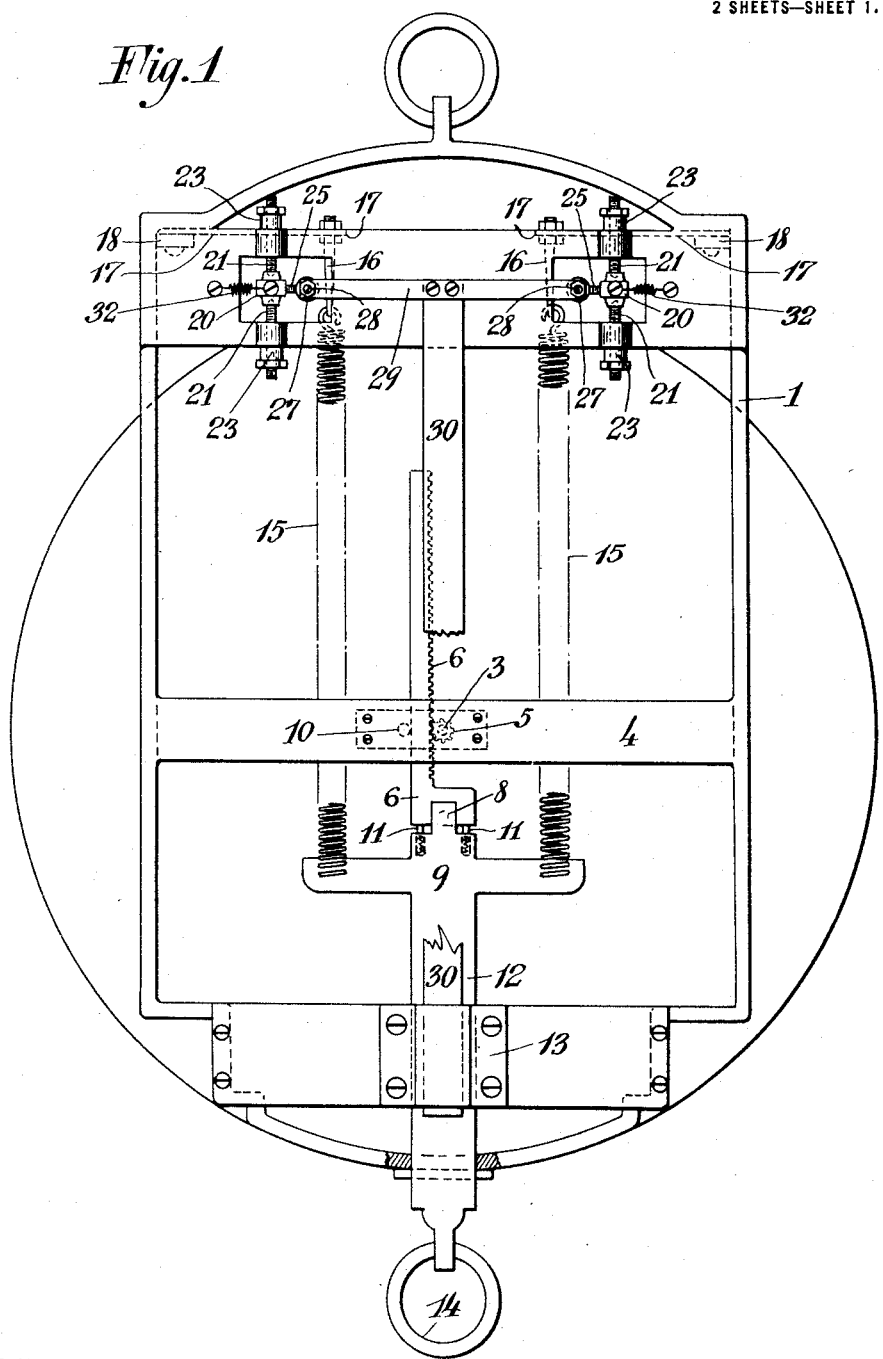
Figure 1 is a rear elevation of a scale embodying the invention.

1 represents a casing carrying on its front a dial provided with a pointer, of usual construction and not shown herein. The pointer is carried on a shaft 3 which is journaled in the cross bar, and is driven by a pinion 5 which meshes with the reciprocating rack 6. The rack 6 is pivoted at 8 to a beam 9, and is guided to move vertically by pin 10. 11, 11 represent small spring pressed pins between the end of rack 6 and the beam 9 and permit a limited relative oscillation between beam 9 and rack 6. Connected to the beam 9 is a bar 12 which is guided at 13 and carries at its lower end a ring 14, hook or the like, to which the pan will be attached. 15, 15 represent coil springs attached to the beam 9 at the lower ends; two being specifically illustrated in the present form of the invention. The coil springs are attached at their upper ends to depending pins or swivels 16, which are in turn carried by leaf springs 17 rigidly fastened to the casing at 18. It will be seen that the coil springs 15 and leaf springs 17 are thus in series with each other.

In order to compensate for variations of temperature, (see Fig. 2) the springs 17 are each provided with a thermostatically controlled fulcrum 19, which is carried on the end 20 of the bell crank lever pivoted at 21. The fulcrum 19 consists of a pointed hardened pin which is threaded into the arm 20 and can be adjusted by a small wrench applied to the squared faces 22 so as to bring the point 19 in proper relation to the spring 17 when the pointer is at zero. The pivot pin 21 is journaled at top and bottom in adjustable bearings 23, which permit the entire bell crank lever to be properly adjusted. The other and shorter arm of the bell crank lever consists of a screw 25 having a knife edge head 26 threaded into the arm 20 at one end and bearing against the hardened head 27 of a screw 28 carried by a transversely extending bar 29. This bar 29 is attached to the thermostat 30, herein shown as of the bi-metallic type which is securely attached at its lower end to the casing. By this arrangement, a very long thermostat can be used, and the movement of its free end can be multiplied to any desired extent at the fulcrum pin 19, by varying the proportion between arm 25 and arm 20 of the bell crank lever, which is done by simply turning the screw 25 in or out. 32 is a small tension spring applied to the bell crank lever for holding the head 26 thereof in contact with the head 27 carried by the thermostat 30.

In Fig. 4, the screw 33 which corresponds to the screw 25, has a rounded head 34 which is held between the heads 35 of two screws 36 mounted on a forked extension 37 of the bar 29. In this form, as well as in the other form, lost motion between the various parts is avoided when the fulcrum is moved positively by the thermostat in both directions longitudinally of the leaf spring 17.

The scale herein described has several advantages in addition to that of automatically compensating for temperature. Thus it will be seen that the thermostat itself is entirely relieved of the pressure due to the weight on the scale, this being taken by the pivot 21, and the thermostat only has to move the relatively light lever 20 and connections when the scale is empty. It will also be seen that a single thermostat operates movable fulcrums for two flat springs, which not only simplifies the construction, but enables greater accuracy to be secured. Also, it will be seen that the fulcrum 19 can be adjusted relatively to the flat spring 17 so as to just clear the lower surface, and also independent adjustments are provided for the lever itself. Another advantage is that when the multiplying ratio is varied in calibrating the scale other adjustments and relations are not affected, since the screw 25 having the knife edge head 26 will engage with the head 27 in various positions without affecting the other parts. It will further be seen that a very compact construction is provided in that the thermostat extends vertically between the springs and can have sufficient lateral vibration to produce the necessary multiplied movement of fulcrum 19 without requiring objectionable increase in depth of the casing from front to back. It will be obvious that various modifications and changes in the specific construction herein shown may be made without departing from the scope of the appended claims.

Having thus described my invention, I declare that what I claim as new and desire to secure by Letters Patent, is:—

1. In a scale, measuring means comprising a deflectable spring, a movable fulcrum for said spring, an independent support for said fulcrum, a thermostat for moving said fulcrum, and multiplying connections between said thermostat and said independently supported fulcrum.

2. In a scale, measuring means comprising a deflectable spring, a movable fulcrum for said spring, a thermostat for moving said fulcrum, and multiplying connections including ratio varying means between said thermostat and said fulcrum.

3. In a scale, a weighing spring, a flexible support therefor, a movable fulcrum for said support, a thermostat for moving said fulcrum, and multiplying connections between said thermostat and said fulcrum.

4. In a scale, a weighing spring, a flexible support therefor attached to said spring at one end, the other end of the support being fixed, a fulcrum movable beneath the intermediate portion of the support, a thermostat for moving the fulcrum, and multiplying connections between the thermostat and the fulcrum.

5. In a scale, a coil spring, a flexible support therefor attached to said coil spring at one end, the other end of said support being fixed, a movable fulcrum for the intermediate portion of the support, a lever carrying said fulcrum, a thermostat for moving said lever, and means for varying the ratio of movement between said thermostat and said fulcrum.

6. In a scale, a coil spring, a flexible support therefor attached to said coil spring at one end, the other end of said support being fixed, a movable fulcrum for the intermediate portion of the support, a bell crank lever carrying said fulcrum on one arm, a thermostat connected to the other arm of said lever, and means for adjusting the relation between said arms.

7. In a scale, a weighing spring, a flexible support therefor attached to said spring at one end, the other end of said support being fixed, a movable fulcrum for the intermediate portion of said support, means for adjusting said fulcrum relatively to said support, a thermostat for moving said fulcrum, and means for varying the ratio of movement between said thermostat and said fulcrum.

8. In a scale, weighing mechanism including a deflectable member, a thermostatic compensator comprising a thermostat, a lever connected to one end thereof and controlling the deflection of said member at its other end when loaded, said lever at other times being freely movable by said thermostat independently of said deflectable member.

9. In a scale, a weighing mechanism, comprising a deflectible spring, a coil spring attached to one end thereof, a movable support for the deflectable spring, a lever journaled on the frame and moving said support, and a thermostat independent of the load for actuating said lever.

10. In a scale, a weighing mechanism comprising a flat spring, a coil spring attached to one end thereof, a movable support for the flat spring, a horizontally swinging bell crank lever journaled on the frame and moving said support, and a horizontally swinging thermostat for actuating said lever.

11. In a scale, and in combination with spring weighing mechanism, a thermostat, a lever adapted to be engaged by said thermostat, means carried by said lever for varying the resistance of said spring mechanism according to temperature, and means for regulating the engagement of said thermostat and said lever.

12. In a scale and in combination with spring weighing mechanism, a vertically extending thermostat movable laterally in response to temperature variations, a horizontally swinging lever having actuating connection with said thermostat, the other end of said lever carrying means for varying the resistance of said spring according to temperature, and means for varying the ratio of movement between said thermostat and said resistance varying means.

13. In a spring scale, a beam, a coil spring attached to each end thereof, a deflectable supporting spring for each coil spring, a thermostat, a movable support for each deflectable spring, and actuating means connecting said thermostat and said movable supports to cause simultaneous movement.

14. In a spring scale, a beam, a coil spring attached to each end thereof, a flat supporting spring for each coil spring, a thermostat, a movable support for each flat spring, and means including multiplying connections connecting said thermostat and said movable supports.

15. In a spring scale, a beam, a coil spring attached to each end thereof, a flat supporting spring for each coil spring, a thermostat, a movable support for each flat spring, means connecting said thermostat with both of said movable supports, and means for adjusting said supports relatively to the flat springs.

16. In a spring scale, a beam, a coil spring attached to each end thereof, a flat supporting spring for each coil spring, a thermostat, a movable support for each flat spring, means connecting said thermostat with both of said movable supports, and means for adjusting the actuating connections between said thermostat and the supports.

17. In a spring scale, parallel coil springs, deflectable supporting springs therefor, a beam connected to the other ends of said coil springs, movable supports for said deflectable springs, a vertically projecting laterally movable thermostat, a bar carried thereby, and actuating, multiplying connections between said bar and each of said supports.

18. In a spring scale, weighing mechanism including a spring mounted to be deflected by the load from normal position, a fulcrum movable freely below said spring when in normal position and supporting said spring when the spring is loaded, a thermostat for moving said fulcrum and connections between the thermostat and fulcrum for multiplying at the fulcrum the movement of the thermostat.

19. In a scale including a casing, a vertically movable spring supported weighing mechanism, a vertically extending thermostat secured to the casing and having a portion vibratory in response to temperature variations, a lever having actuating connection at one portion with the vibratory portion of said thermostat, the other portion of said lever carrying means for varying the resistance of said supporting spring.

20. In a scale, measuring means comprising a deflectable spring having its movable portion adapted to be connected to the load, a fulcrum movable freely at no load for supporting said spring when loaded, and a thermostat independent of the load for automatically moving said fulcrum at no load according to temperature variations.

In testimony whereof I affix my signature, in presence of two witnesses.

RALPH F. CHATILLON.

Witnesses:
GEORGE W. BLACKMAN,
JAS. K. CROSS.